(12) United States Patent
Mizuno et al.

(10) Patent No.: US 9,399,426 B2
(45) Date of Patent: Jul. 26, 2016

(54) TURNING DIRECTION INDICATOR

(71) Applicant: YAZAKI CORPORATION, Tokyo (JP)

(72) Inventors: Yoshiyuki Mizuno, Makinohara (JP); Hidehiro Akahori, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 140 days.

(21) Appl. No.: 14/546,333

(22) Filed: Nov. 18, 2014

(65) Prior Publication Data

US 2015/0070161 A1 Mar. 12, 2015

Related U.S. Application Data

(63) Continuation of application No. PCT/JP2013/069030, filed on Jul. 11, 2013.

(30) Foreign Application Priority Data

Jul. 13, 2012 (JP) .................................. 2012-157838

(51) Int. Cl.
*B60Q 1/34* (2006.01)
*B60Q 1/40* (2006.01)
*B62D 15/02* (2006.01)

(52) U.S. Cl.
CPC *B60Q 1/346* (2013.01); *B60Q 1/40* (2013.01); *B62D 15/0215* (2013.01)

(58) Field of Classification Search
CPC ........... B60Q 1/42; B60Q 1/0076; B60Q 1/40
USPC ............... 340/477, 476, 475, 465; 200/61.27, 200/61.28
See application file for complete search history.

(56) References Cited

U.S. PATENT DOCUMENTS 4,333,071 A * 6/1982 Kira .................. B60Q 1/40 200/61.31
4,855,542 A * 8/1989 Furuhashi ................ B60Q 1/42 200/61.27

(Continued)

FOREIGN PATENT DOCUMENTS

CN 101905673 A 12/2010
JP 61-054333 A 3/1986

(Continued)

OTHER PUBLICATIONS

Communication from the State Intellectual Property Office of P.R. China dated Dec. 17, 2015 in a counterpart Chinese application No. 201380031643.6.

(Continued)

*Primary Examiner* — Hoi Lau
(74) *Attorney, Agent, or Firm* — Sughrue Mion, PLLC

(57) ABSTRACT

In a turning direction indicator, a first determination section determines whether a steering angle becomes equal to or larger than a first angle in one turning direction after the steering angle becomes a rotation angle in another turning direction opposite to the one turning direction in a state where an indication operation section is operated to a position indicating the one turning direction and the one turning direction is displayed by a display section. A second determination section determines whether the steering angle becomes equal to or smaller than a second angle smaller than the first angle after the steering angle becomes equal to or larger than the first angle. If the second determination section determines that the steering angle is equal to or smaller than the second angle, a cancelation section cancels the display of the turning direction by the display section.

3 Claims, 6 Drawing Sheets

(56) References Cited

U.S. PATENT DOCUMENTS

| | | | | |
|---|---|---|---|---|
| 4,962,366 A | * | 10/1990 | Hatanaka | B60Q 1/40 340/432 |
| 2002/0024434 A1 | * | 2/2002 | Okuda | B60Q 1/40 340/476 |
| 2009/0205936 A1 | * | 8/2009 | Ueno | B60Q 1/40 200/61.28 |
| 2010/0156621 A1 | * | 6/2010 | Nishimura | B60Q 1/42 340/476 |
| 2010/0219051 A1 | * | 9/2010 | Shimizu | B60Q 1/42 200/61.27 |
| 2010/0308988 A1 | * | 12/2010 | Ieda | B60Q 1/40 340/477 |
| 2015/0137964 A1 | * | 5/2015 | Shimada | B60Q 1/42 340/476 |

FOREIGN PATENT DOCUMENTS

| | | |
|---|---|---|
| JP | 06-032170 A | 2/1994 |
| JP | 2006-117047 A | 5/2006 |
| JP | 2008-260363 A | 10/2008 |
| JP | 2010-201982 A | 9/2010 |
| JP | 2011-088601 A | 5/2011 |
| JP | 4793312 B2 | 10/2011 |

OTHER PUBLICATIONS

International Search Report for PCT/JP2013/069030 dated Sep. 10, 2013 [PCT/ISA/210].

Written Opinion for PCT/JP2013/069030 dated Sep. 10, 2013 [PCT/ISA/237].

International Preliminary Report on Patentability dated Jan. 13, 2015 issued by International Bureau of WIPO in counterpart International Application No. PCT/JP2013/069030.

* cited by examiner

TURNING DIRECTION INDICATOR

CROSS REFERENCE TO RELATED APPLICATIONS

This application is a continuation of PCT application No. PCT/JP2013/069030, which was filed on Jul. 11, 2013 based on Japanese Patent Application (No. 2012-157838) filed on Jul. 13, 2012, the contents of which are incorporated herein by reference.

BACKGROUND OF THE INVENTION

1. Field of the Invention

The present invention relates to a turning direction indicator which indicates the turning direction of a vehicle.

2. Description of the Related Art

Conventionally, some of operation levers for mechanically turning ON/OFF a turn signal switch include a self-canceling mechanism. In an operation lever having a self-canceling mechanism, when a steering wheel is rotated, the operation lever is returned to a neutral (N) position. Specifically, a cancel cam which is rotatably supported on a steering shaft is rotated following the rotation of the steering wheel, and a cancel pin is rotated. Then, the cancel pin drives a ratchet is attached to a rotatable shaft, and the operation lever is returned from a right turn (R) position or a left turn (L) position to the N position. In this case, even when steering wheel is reversely operated, the self-canceling operation occurs.

Also some of operation levers for turning ON and OFF a turn signal switch in an electronic control manner are of a self-canceling type. In the case of an operation lever of this type, the cancelation timing is identical with that in an operation lever which mechanically operates a turn signal switch.

Among turn signal switches, there are those in which an arbitrary steering angle is detected by a steering angle sensor or the like, and a signal is output. In a momentary type turn signal switch which is switched ON during a period when the switch is operated by an operation lever, a technique in which a turn signal is turned OFF by an electronic control is known.

JP-A-H06-032170 describes the prior art of this type. JP-A-H06-032170 discloses a technique in which a delay operation of maintaining lighting states of a turning indicator and a cornering lamp is performed for several seconds after an operation switch is returned from the operation state to the neutral point. JP-A-H06-032170 further discloses that, when the operation switch is returned by a driver's operation, the delay operation is inhibited.

JP-A-2010-201982 discloses a turn signal device in which, after lighting of a turn signal is performed, monitors the degree of a temporal change of the rotational direction of a steering wheel. When it is detected that, after the steering wheel is once rotated in the direction indicated by a turn signal, the steering wheel is rotated in the opposite direction, and then rotated in the direction indicated by the turn signal, the turn signal device turns OFF the turn signal.

JP-A-2006-117047 discloses a turn direction indicating device in which, when a lever is swung to a middle position B or D, the lever is automatically returned to a neutral position A, and a driving signal is supplied to a lighting device for a predetermined time period. In the turn direction indicating device, in the case of a lane change or the like, a turn signal lamp blinks only for the predetermined time period.

JP-B-4793312 discloses a configuration where, when a lever is swung to a neutral position, a lighting device performs a blinking operation, and stops the operation after a predetermined number of blinking intervals. According to the configuration, even when the hand is immediately released from the lever to cause the lever to be automatically returned to the neutral position, the blinking operation is surely performed.

SUMMARY OF THE INVENTION

However, the above-described related-art turning direction indicators have the following problems. In a vehicle which cannot turn in a small radius, such as a large truck, when the vehicle is to turn right (or turn left), a steering operation (reverse steering operation) in which a steering wheel is rotated in the direction opposite to the course of the vehicle is once performed. In this case, a direction indicator which is previously set is automatically canceled (self-canceled).

Therefore, the driver continues to manually hold an operation lever for a turn signal switch of the direction indicator to an R (or L) position until the right turn (or left turn) is completed. Consequently, the driver must simultaneously perform two operations, i.e., a steering operation and a lever operation, and therefore driving safety is reduced.

The invention has been made in view of the above-discussed circumstances, and an object thereof is to provide a turning direction indicator in which, even when a steering wheel is rotated left (right) during a right turn (or left turn), the display of the turning direction is not canceled.

In order to accomplish the object, the turning direction indicator of the invention is characterized in following (1) to (3).

(1) A turning direction indicator which indicates a turning direction of a vehicle, including:

an indication operation section which is operated from a neutral position to a position indicating the turning direction, thereby switching display of the turning direction to an ON state;

a display section which, when the display of the turning direction is switched to the ON state by the indication operation section, displays the turning direction;

a steering angle detection section which detects a steering angle of a steering wheel that is operated for changing a course of the vehicle;

a first determination section which determines whether the steering angle detected by the steering angle detection section becomes equal to or larger than a magnitude of a first angle that is a rotation angle in a one turning direction after the steering angle becomes a rotation angle in another turning direction that is opposite to the one turning direction in a state where the indication operation section is operated to a position indicating the one turning direction and in a state where the one turning direction is displayed by the display section;

a second determination section which determines whether the steering angle detected by the steering angle detection section becomes equal to or smaller than a magnitude of a second angle that is smaller than the first angle after the steering angle becomes equal to or larger than the magnitude of the first angle; and a cancelation section which, if the second determination section determines that the steering angle is equal to or smaller than the magnitude of the second angle, cancels the display of the turning direction by the display section.

(2) The turning direction indicator having the configuration of (1) above, wherein when the steering angle of the steering wheel is the cancel angle, the indication operation section is automatically returned to the neutral position, and wherein the first angle is a rotation angle which is larger than the cancel angle, and the second angle is a rotation angle which is smaller than the cancel angle.

(3) The turning direction indicator having the configuration of (1) or (2) above, wherein in a case where a center position of the steering wheel is a value of 0 and in a case where the steering wheel is at an rotation angle in a right turning direction and a left turning direction, the steering angle detection section detects the steering angle of the steering wheel as values which are different in their positive and negative signs.

According to the turning direction indicators having the configurations of (1) to (3) above, in the case where it is determined that, in the state where the one turning direction is displayed, the steering angle detected by the steering angle detection section becomes equal to or smaller than the magnitude of the second angle after the steering angle becomes a rotation angle in the other turning direction, and becomes further equal to or larger than the magnitude of the first angle which is a rotation angle in the one turning direction, the display of the turning direction is canceled.

According to the invention, in the case where it is determined that, in the state where the one turning direction is displayed, the steering angle detected by the steering angle detection section becomes equal to or smaller than the magnitude of the second angle after the steering angle becomes in the other turning direction and equal to or larger than the magnitude of the first angle which is a rotation angle in the one turning direction, the display of the turning direction is canceled. Therefore, even when the steering wheel is rotated left (right) during a right turn (or left turn), the display of the turning direction is not canceled. Consequently, botheration of continuing the operation of the indication operation section can be eliminated. As a result, driving safety can be ensured.

In the above, the invention has been briefly described. When a mode for carrying out the invention (hereinafter, referred to as "embodiment") which will be described below is through read with reference to the accompanying drawings, a detail of the invention will be further clarified.

DETAILED DESCRIPTION OF THE EXEMPLARY EMBODIMENTS

Figure 1:
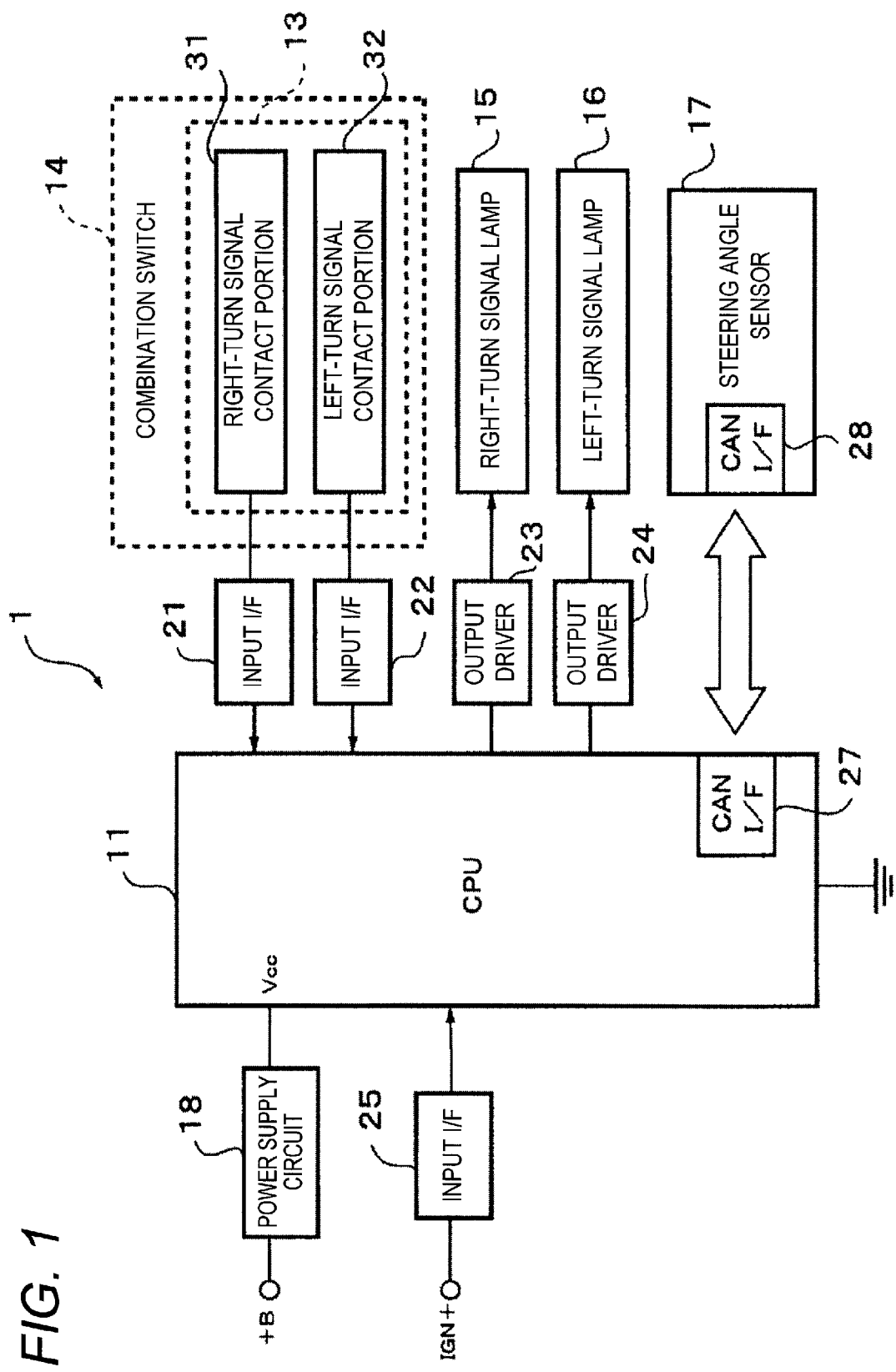
FIG. 1 is a view showing the configuration of a turning direction indicator 1 of an embodiment of the invention.

A turning direction indicator of an embodiment of the invention will be described with reference to the drawings. FIG. 1 is a view showing the configuration of the turning direction indicator 1 of the embodiment of the invention. The turning direction indicator 1 is of the electronic control type, and includes a CPU 11, a combination switch 14, a right-turn signal lamp 15, a left-turn signal lamp 16, and a steering angle sensor 17.

The combination switch 14 has a turn signal switch 13. The turn signal switch 13 is switched ON by an operation lever 43 which is vertically swingable about a steering shaft 42 (see FIGS. 2 to 3C).

The operation lever 43 is operated by the driver from a neutral (N) position to a right turn (R) position or a left turn (L) position. Thereafter, the operation lever 43 is returned to the neutral position (N position) by rotation of the steering shaft 42.

The turn signal switch 13 has a right-turn signal contact portion 31 and a left-turn signal contact portion 32. The right-turn signal contact portion 31 is connected to the CPU 11 through an input I/F 21. The left-turn signal contact portion 32 is connected to the CPU 11 through an input I/F 22. When the driver lowers the operation lever 43 to the R position, the right-turn signal contact portion 31 is turned ON. When the driver raises the operation lever 43 to the L position, the left-turn signal contact portion 32 is turned ON.

The right-turn signal lamp 15 is driven by an output driver 23 connected to the CPU 11, and blinks or goes off based on a control signal supplied from the output driver 23. The left-turn signal lamp 16 is driven by an output driver 24 connected to the CPU 11, and blinks or goes off based on a control signal supplied from the output driver 24. The right-turn signal lamp 15 and the left-turn signal lamp 16 correspond to the display section.

The steering angle sensor 17 is disposed on the steering shaft 42 (see FIG. 2), and the absolute steering angle, i.e., the center position of a steering wheel 41 is set to the center of the steering angle or 0 degrees. Moreover, the steering angle sensor 17 can detect a right rotation (minus) steering angle and the left rotation (plus) steering wheel, as values of respective different signs. A configuration where a relative steering angle is detected may be employed. Furthermore, the steering angle sensor 17 incorporates a CAN (Controller Area Network) I/F 28. The CPU 11 incorporates a CAN I/F 27, and transmits and receives signals to and from the steering angle sensor 17 via the CAN I/F 28 incorporated in the steering angle sensor 17.

The CPU 11 receives the following signals. Namely, an R-position signal supplied from the right-turn signal contact portion 31 via the input I/F 21, an L-position signal supplied from the left-turn signal contact portion 32, and a steering angle signal which is detected by the steering angle sensor 17 via the CAN I/F 27 are input to the CPU. Based on these input signals, the CPU 11 performs a control for stopping the blinking of the right-turn signal lamp 15 and the left-turn signal lamp 16 in accordance with a control program which will be described later.

Moreover, an ignition (IGN) SW is connected to the CPU 11 via an input I/F 25. Furthermore, the CPU 11 is powered by a power supply circuit 18 connected to a battery (+B).

Figure 2:
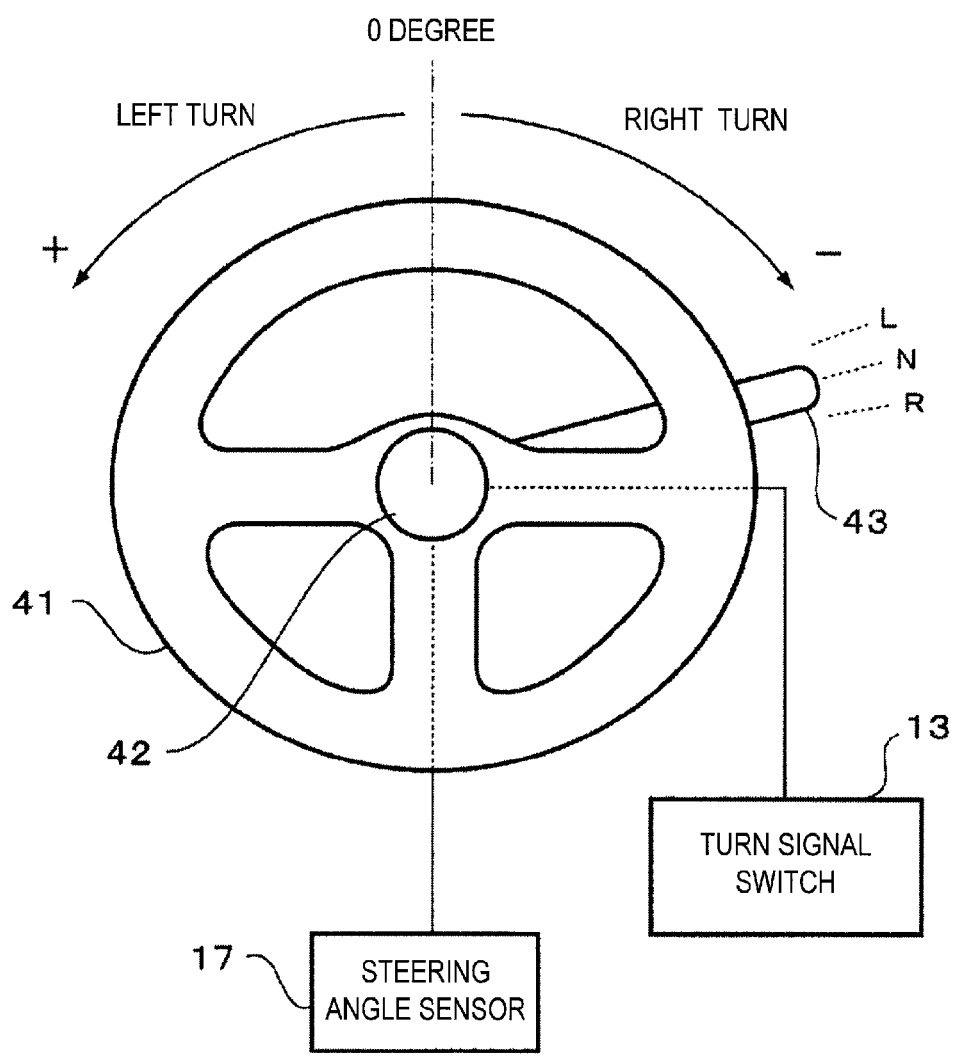
FIG. 2 is a view showing the rotational direction of a steering wheel 41.

FIG. 2 is a view showing the rotational direction of the steering wheel 41. The steering angle sensor 17 is attached to the steering shaft 42. In the steering angle sensor 17, as described above, the center position is set to the center 0 degrees of the steering angle, angles (steering angles) of left/right rotations are detected as plus/minus angles, respectively, and signals of the angles are output. Here, it is assumed that, when the steering wheel 41 is right-rotated, a minus angle is detected, and, when the steering wheel 41 is left-rotated, a plus steering angle is detected. Furthermore, it is assumed that the rotational direction is indicated by the plus/minus, and the magnitude of the angle is indicated by an absolute value.

Figure 3A:
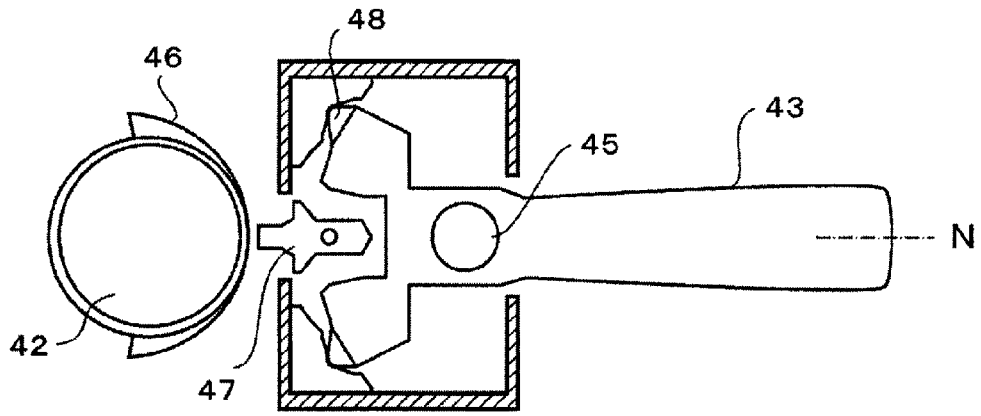
FIGS. 3A to 3C are views illustrating a self-canceling operation of an operation lever 43.
Figure 3B:
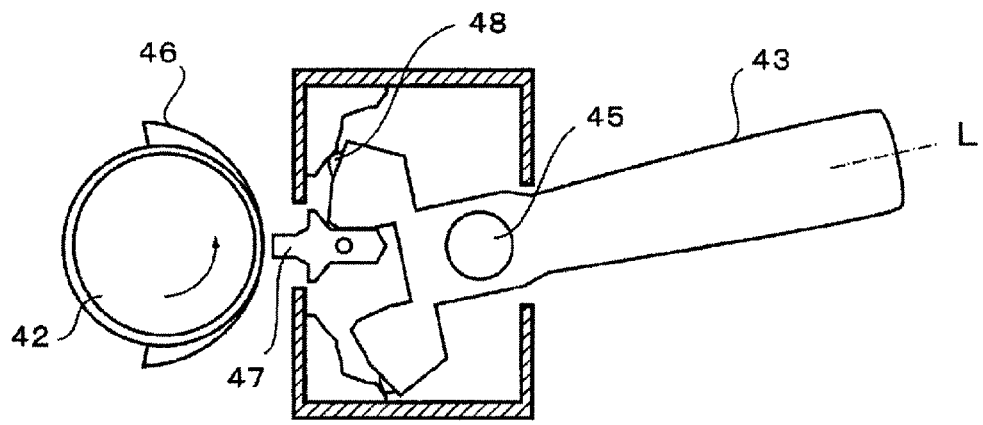
Figure 3C:
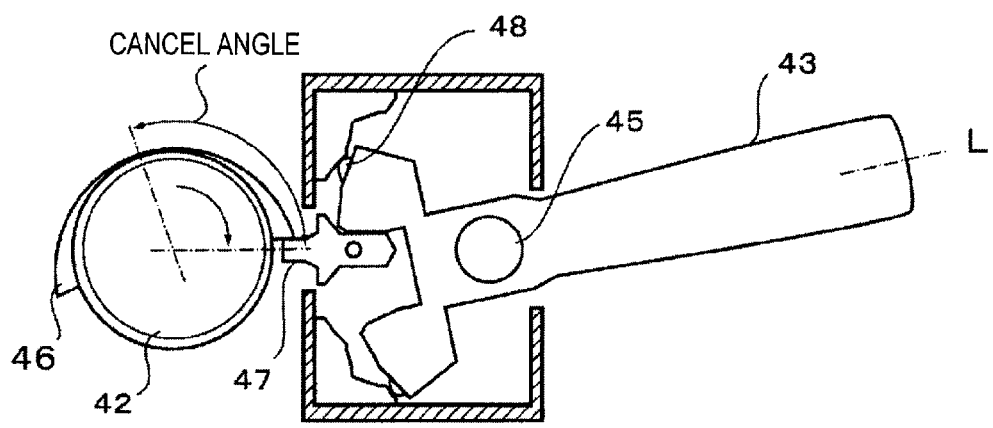

FIGS. 3A to 3C are views illustrating a self-canceling operation of the operation lever 43. The operation lever 43 is swingable about a movable shaft 45. The operation lever 43 has a ratchet mechanism 48 in an end portion on the side of the steering wheel. When the operation lever 43 is swung to the R position or the L position, the operation lever 43 maintains the position.

On the other hand, a cancel cam 46 is rotatably supported on the steering shaft 42. When, after the steering shaft 42 is rotated by operating the steering wheel to an angle which exceeds the cancel angle (see FIG. 3C), the steering shaft is rotated in the opposite direction, the cancel cam 46 presses a cancel pin 47, whereby the cancel pin 47 is swung. The swing of the cancel pin 47 causes the ratchet mechanism 48 to be released, and the operation lever 43 is returned to the neutral (N) position.

As described above, when the operation lever 43 is operated from the neutral (N) position to the right turn (R) position or the left turn (L) position, and then the ratchet mechanism 48 is released by the cancel cam 46 which is rotatably supported on the steering shaft 42, the operation lever is returned to the neutral position (N position). The cancel angle varies depending on the vehicle type (a truck, a passenger vehicle) or the like, and is set to an arbitrary value such as 130 degrees or 40 degrees.

The operation of the turning direction indicator 1 having the above-described configuration will be described. When the driver lowers the operation lever 43 to the right turn (R) position, and the right-turn signal contact portion 31 is turned ON, as described above, the right-turn signal lamp 15 blinks. When the driver raises the operation lever 43 to the left turn (L) position, and the left-turn signal contact portion 32 is turned ON, similarly, the left-turn signal lamp 16 blinks.

In the embodiment, a case is assumed where, when a vehicle which cannot turn in a small radius, such as a large truck is to turn right or left, a steering operation in which a steering wheel is rotated in the direction opposite to the course is once performed. The steering operation in which a steering wheel is rotated in the direction opposite to the course is referred to as a reverse steering operation. In the embodiment, particularly, a self-canceling operation will be described in which, when a right or left turn is made by performing a reverse steering operation, a blinking state of the left-turn signal lamp 16 or the right-turn signal lamp 15 blinks is stopped (extinguished) at an adequate timing. As described above, the cancel angle of the steering shaft 42 can be arbitrarily set. Here, it is assumed that +40 degrees of the steering angle of the steering wheel 41 is set as the cancel angle.

Figure 4:
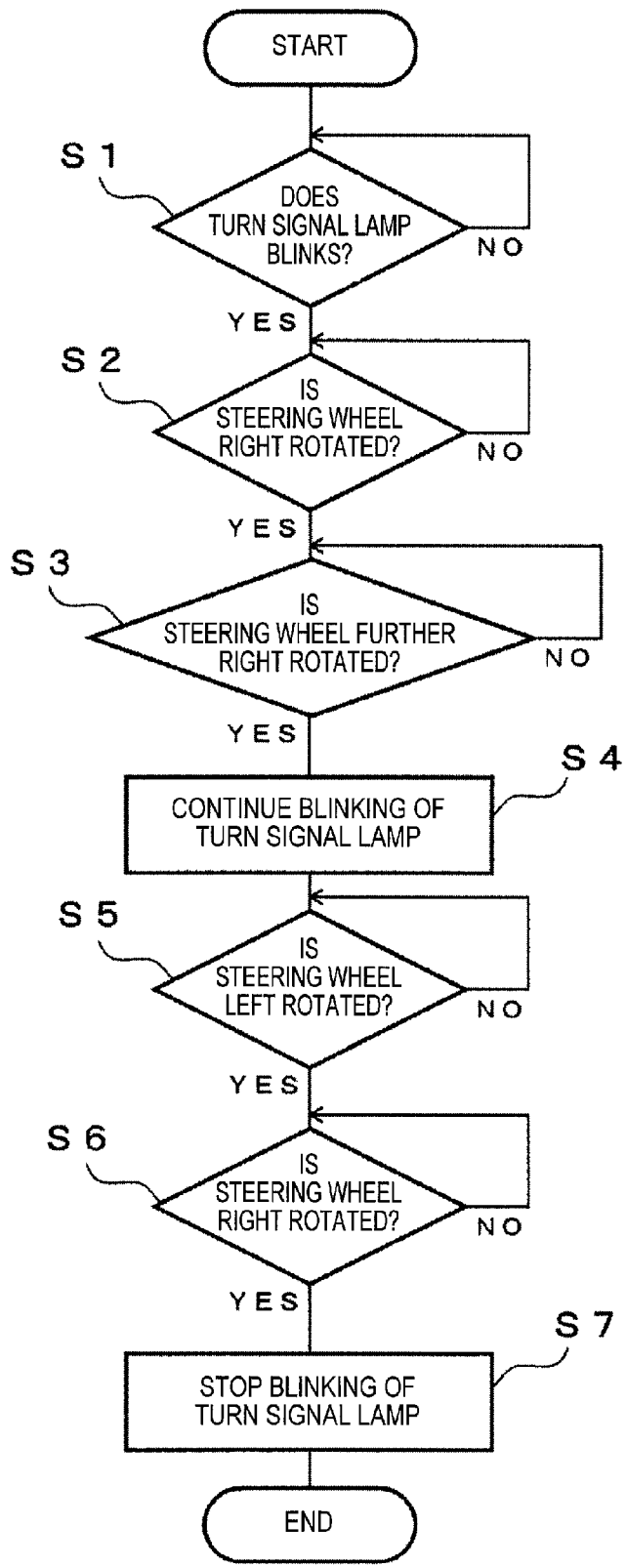
FIG. 4 is a flowchart showing the procedure of an operation of self-canceling a turn signal in the turning direction indicator 1 of the embodiment of the invention.

FIG. 4 is a flowchart showing the procedure of the operation of self-canceling the turn signal in the turning direction indicator 1 of the embodiment of the invention. The control program is stored in a ROM (not shown) of the CPU 11, and executed by the CPU 11.

Here, a case where a left turn is made by a reverse steering operation will be described. A similar procedure is performed also in a case where a right turn is made by a reverse steering operation. FIGS. 5A to 5E are views showing a locus of a vehicle 50 in the case where the vehicle is caused to turn in the left direction by a reverse steering operation.

Figure 5A:
FIGS. 5A to 5E are views showing a locus of a vehicle 50 in the case where a left turn is made by performing a reverse steering operation.

First, the CPU 11 waits until the operation lever 43 is operated to the left turn (L) position by the driver, and the left-turn signal lamp 16 blinks (step S1). In this state, the vehicle 50 is on a straight course a as shown in FIG. 5A.

When the left-turn signal lamp 16 starts to blink, the CPU 11 waits until the steering angle detected by the steering angle sensor 17 is changed from an angle of 0 corresponding to the center position to a right-rotation angle (minus angle) and the steering wheel 41 is rotated right (step S2).

Figure 5B:

When the steering wheel 41 which is operated by the driver is rotated right, a course b of the vehicle 50 bends in the right direction as shown in FIG. 5B. In the case where, in step S2, the steering angle detected by the steering angle sensor 17 is changed from a center angle of 0 corresponding to the center position to a left rotation angle (plus angle), and the steering wheel 41 is rotated left, the CPU 11 determines that a usual steering operation is performed.

Figure 5C:
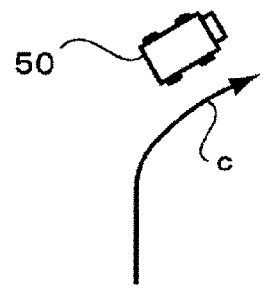

The CPU 11 further waits until the steering angle detected by the steering angle sensor 17 is changed to a right rotation angle (−322 degrees or more) which is approximately close to one rotation (step S3). The angle is not limited to an angle (−322 degrees or more) which is approximately close to one rotation, and may be an angle which exceeds one rotation (−360 degrees). When the steering wheel 41 reaches the angle which is approximately close to one rotation, a course c of the vehicle 50 largely bends as shown in FIG. 5C.

Also after the steering angle reaches the angle which is approximately close to one rotation, the CPU 11 maintains the blinking state of the left-turn signal lamp 16 (step S4).

Figure 5D:
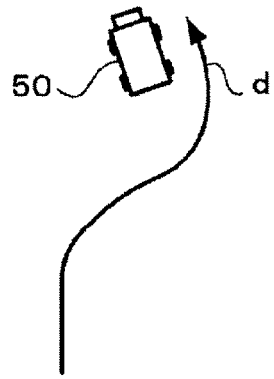

When the driver operates the steering wheel 41 so as to be changed from the right rotation to the left rotation, a course d of the vehicle starts to turn in the left direction as shown in FIG. 5D. The CPU 11 waits until the steering angle detected by the steering angle sensor 17 is increased to a preliminary angle (+42 degrees) which is larger than the cancel angle (+40 degrees) in the left rotation by 2 degrees, or more (step S5). The preliminary angle (+42 degrees) corresponds to the first angle. Moreover, the process of step S5 corresponds to the first determination section.

Figure 5E:
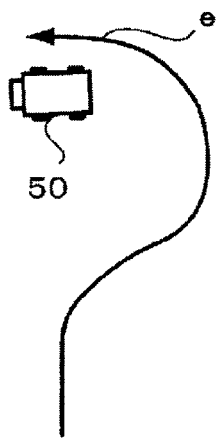

After the steering angle is increased to the preliminary angle or more and the vehicle largely turns in the left direction, in order to straighten a course e of the vehicle 50, as shown in FIG. 5E, the driver rotates the steering wheel 41 in the right direction to try to return the steering wheel to the original position. The CPU 11 waits until the steering angle detected by the steering angle sensor 17 is returned to a preliminary angle (+38 degrees) which is smaller than the cancel angle by 2 degrees, or less (step S6). The preliminary angle (+38 degrees) corresponds to the second angle. Moreover, the process of step S6 corresponds to the second determination section.

If the steering angle detected by the steering angle sensor 17 is returned to the preliminary angle (+38 degrees) or less, the CPU 11 performs the self-canceling operation to stop the blinking of the left-turn signal lamp 16 (step S7). The process of step S6 corresponds to the cancelation section. Thereafter, the CPU 11 terminates the operation.

Figure 6:
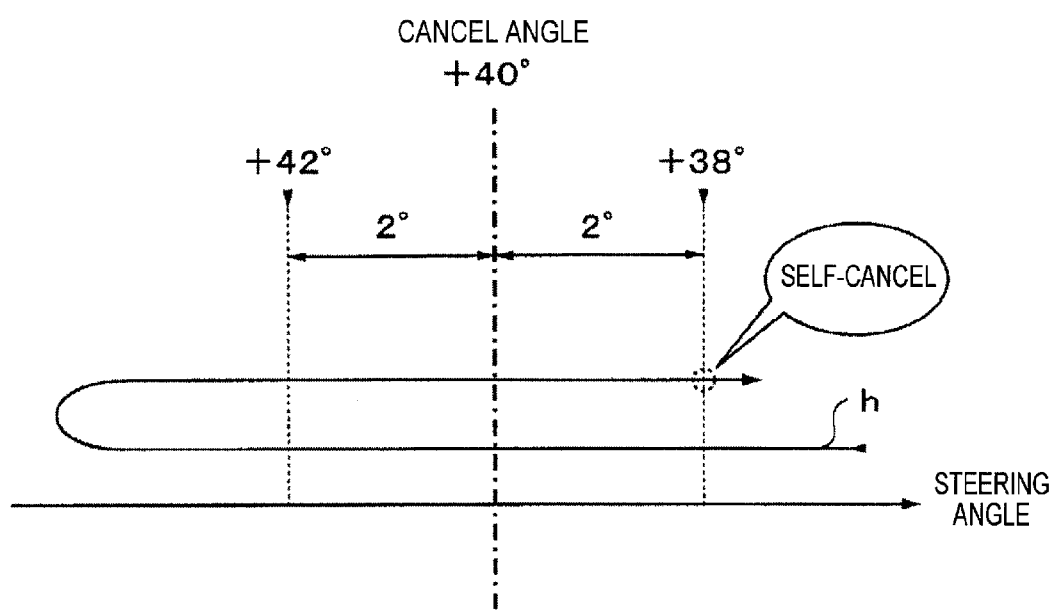
FIG. 6 is a view illustrating a timing of the self-canceling operation by the turning direction indicator 1 of the embodiment of the invention.

FIG. 6 is a view illustrating a timing of the self-canceling operation by the turning direction indicator 1 of the embodiment of the invention. In the case where the vehicle is to turn in the left direction, as indicated by the reference symbol h, the turning direction indicator 1 performs the self-canceling operation when, after the detected steering angle is equal to or larger than the preliminary angle (+42 degrees) which is larger than the cancel angle (+40 degrees) by 2 degrees, the steering angle is equal to or smaller than the preliminary angle (+38 degrees) which is smaller than the cancel angle by 2 degrees.

Similarly, in the case where the vehicle is to turn in the right direction, the turning direction indicator 1 performs the self-canceling operation when, after the detected steering angle is equal to or larger than a preliminary angle (−42 degrees) which is larger than a cancel angle (−40 degrees) by 2 degrees, the steering angle is equal to or smaller than a preliminary angle (−38 degrees) which is smaller than the cancel angle by 2 degrees.

According to the turning direction indicator of the embodiment, even when the steering wheel is rotated right (left) during a left turn (or right turn) by a reverse steering operation, the blinking of the left-turn (right-turn) signal is not canceled. Consequently, botheration of continuing the holding of the operation lever can be eliminated. Moreover, the driver is prevented from simultaneously performing two operations, i.e., a steering operation and a lever operation, and therefore driving safety can be ensured.

Moreover, the preliminary angles in steps S5 and S6 are angles which are slightly larger and smaller than the cancel angle that causes the operation lever to be automatically returned, respectively. Therefore, the stopping of blinking of a turn signal lamp, and the returning of the operation lever to the neutral position (N position) can be synchronized with each other.

Furthermore, in the case where the steering wheel is at the center position, in the steering sensor, the steering angle of the steering wheel is set to a value of 0, and, in the case where the steering wheel is at a rotation angle in the left turning direction, the steering angle sensor detects a plus value, and, in the case where the steering wheel is at a rotation angle in the right turning direction, detects a minus value. Therefore, a process dealing with the steering angle is simplified.

The invention is not limited to the configuration of the above-described embodiment, and is applicable to any configuration as far as it can attain the functions of the configuration of the embodiment.

In the embodiment, for example, the preliminary angle is set to a value which is larger by 2 degrees than the cancel angle (+40 degrees). The preliminary angle is not limited to this. The preliminary angle can be changed to a value which is larger by 3 degrees or more. The preliminary angle may be set to different values depending on whether the turning direction is the left turning direction or the right turning direction.

In the invention, in the case where the turning direction of a vehicle is indicated, even when the steering wheel is rotated left (right) during a right turn (or left turn), as described above, the display of the turning direction is not canceled. Consequently, botheration of continuing the operation of the indication operation section can be eliminated. As a result, driving safety can be ensured, and the invention is useful.

Features of the above-described embodiment of the turning direction indicator of the invention are listed in [1] to [3] below in a brief and summarized manner.

[1] The turning direction indicator (1) which indicates a turning direction of a vehicle, including:
an indication operation section (operation lever 43) which is operated from a neutral position (N) to a position indicating the turning direction, thereby switching display of the turning direction to an ON state;
a display section (turn signal lamps 15, 16) which, when the display of the turning direction is switched to the ON state by the indication operation section, displays the turning direction;
a steering angle detection section (steering angle sensor 17) which detects a steering angle of a steering wheel that is operated for changing a course of the vehicle;
a first determination section (CPU 11, step S5) which determines whether the steering angle detected by the steering angle detection section becomes equal to or larger than a magnitude of a first angle that is a rotation angle in a one turning direction after the steering angle becomes a rotation angle in another turning direction that is opposite to the one turning direction in a state where the indication operation section is operated to a position indicating the one turning direction and in a state where the one turning direction is displayed by the display section;
a second determination section (CPU 11, step S6) which determines whether the steering angle detected by the steering angle detection section becomes equal to or smaller than a magnitude of a second angle that is smaller than the first angle after the steering angle becomes equal to or larger than the magnitude of the first angle; and
a cancelation section (CPU 11, step S7) which, if the second determination section determines that the steering angle is equal to or smaller than the magnitude of the second angle, cancels the display of the turning direction by the display section.

The turning direction indicator (1) according to [1],
wherein when the steering angle of the steering wheel becomes the cancel angle, the indication operation section is automatically returned to the neutral position (N), and
wherein the first angle is a rotation angle which is larger than the cancel angle, and the second angle is a rotation angle which is smaller than the cancel angle.

[3] The turning direction indicator (1) according to [1] or [2],
wherein in a case where a center position of the steering wheel is a value of 0 and in a case where the steering wheel is at an rotation angle in a right turning direction and a left turning direction, the steering angle detection section detects the steering angle of the steering wheel as values which are different in their positive and negative signs.

Although the invention has been described in detail and with reference to the specific embodiment, it is obvious to a person skilled in the art that various changes and modifications can be made without departing from the spirit and scope of the invention.

According to the invention, even when the steering wheel is rotated left (right) during a right turn (or left turn), the display of the turning direction is not canceled. Consequently, botheration of continuing the operation of the indication operation section can be eliminated. As a result, driving safety can be ensured.

The invention which achieves the effects is useful in the field of a turning direction indicator which indicates the turning direction of a vehicle.

What is claimed is:

1. A turning direction indicator which indicates a turning direction of a vehicle, comprising:
an indication operation section which is operated from a neutral position to a position indicating the turning direction, thereby switching display of the turning direction to an ON state;
a display section which, when the display of the turning direction is switched to the ON state by the indication operation section, displays the turning direction;
a steering angle detection section which detects a steering angle of a steering wheel that is operated for changing a course of the vehicle;
a first determination section which determines whether the steering angle detected by the steering angle detection section becomes equal to or larger than a magnitude of a first angle that is a rotation angle in a one turning direction after the steering angle becomes a rotation angle in another turning direction that is opposite to the one turning direction in a state where the indication operation section is operated to a position indicating the one turning direction and in a state where the one turning direction is displayed by the display section;

a second determination section which determines whether the steering angle detected by the steering angle detection section becomes equal to or smaller than a magnitude of a second angle that is smaller than the first angle after the steering angle becomes equal to or larger than the magnitude of the first angle; and a cancelation section which, if the second determination section determines that the steering angle is equal to or smaller than the second angle, cancels the display of the turning direction by the display section.

2. The turning direction indicator according to claim 1, wherein when the steering angle of the steering wheel becomes the cancel angle, the indication operation section is automatically returned to the neutral position, and wherein the first angle is a rotation angle which is larger than the cancel angle, and the second angle is a rotation angle which is smaller than the cancel angle.

3. The turning direction indicator according to claim 1, wherein in a case where a center position of the steering wheel is a value of 0 and in a case where the steering wheel is at an rotation angle in a right turning direction and a left turning direction, the steering angle detection section detects the steering angle of the steering wheel as values which are different in their positive and negative signs.

\* \* \* \* \*